(12) United States Patent
Kwon et al.

(10) Patent No.: US 7,248,553 B2
(45) Date of Patent: Jul. 24, 2007

(54) LASER POWER CONTROL DEVICE

(75) Inventors: Sung-du Kwon, Seoul (KR); Jun-hyuk Lee, Suwon-si (KR); Yong-jun Cho, Suwon-si (KR); Jung-koog Lee, Seoul (KR); Hyun-cheal Bang, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 642 days.

(21) Appl. No.: 10/705,240

(22) Filed: Nov. 12, 2003

(65) Prior Publication Data

US 2004/0184378 A1    Sep. 23, 2004

(30) Foreign Application Priority Data

Nov. 12, 2002   (KR) ............................ 2002-70057

(51) Int. Cl.
*G11B 7/00*    (2006.01)
(52) U.S. Cl. .................... 369/53.26; 369/116
(58) Field of Classification Search ................ 369/116, 369/47.53, 47.5, 53.26, 59.11; 372/38.02, 372/38.01, 29.02
See application file for complete search history.

(56) References Cited

U.S. PATENT DOCUMENTS 6,671,248 B2 * 12/2003 Miyabata et al. ........... 369/116
6,683,836 B2 * 1/2004 Miyagawa et al. ...... 369/53.26
6,728,183 B1 * 4/2004 Takeuchi et al. ......... 369/53.27

FOREIGN PATENT DOCUMENTS

| JP | 11-144288 | 5/1999 |
|---|---|---|
| JP | 200298832 | 10/2000 |
| KR | 2001-0114241 | 12/2001 |

\* cited by examiner

*Primary Examiner*—Ali Neyzari
(74) *Attorney, Agent, or Firm*—Staas & Halsey LLP

(57) ABSTRACT

A laser power control device for use in an optical recording and/or reproducing apparatus that records data on and/or reproduces data from an optical recording medium by driving a laser diode with a laser diode driver. The device includes: a peak power monitor which monitors a peak power by a sample-and-hold operation, the peak power being output by the laser diode when pits are formed in the optical recording medium; an elimination power monitor which monitors an elimination power by the sample-and-hold operation, the elimination power being output by the laser diode when a space between pits of the optical recording medium is formed; a peak power setter which sets a peak power in the laser diode driver based on a monitoring result of the peak power monitor; an elimination power setter which sets an elimination power in the laser diode driver based on a monitoring result of the elimination power monitor; and a bias power setter which sets a bias power in the laser diode driver based on the monitoring results of the peak power monitor and the elimination power monitor.

31 Claims, 6 Drawing Sheets

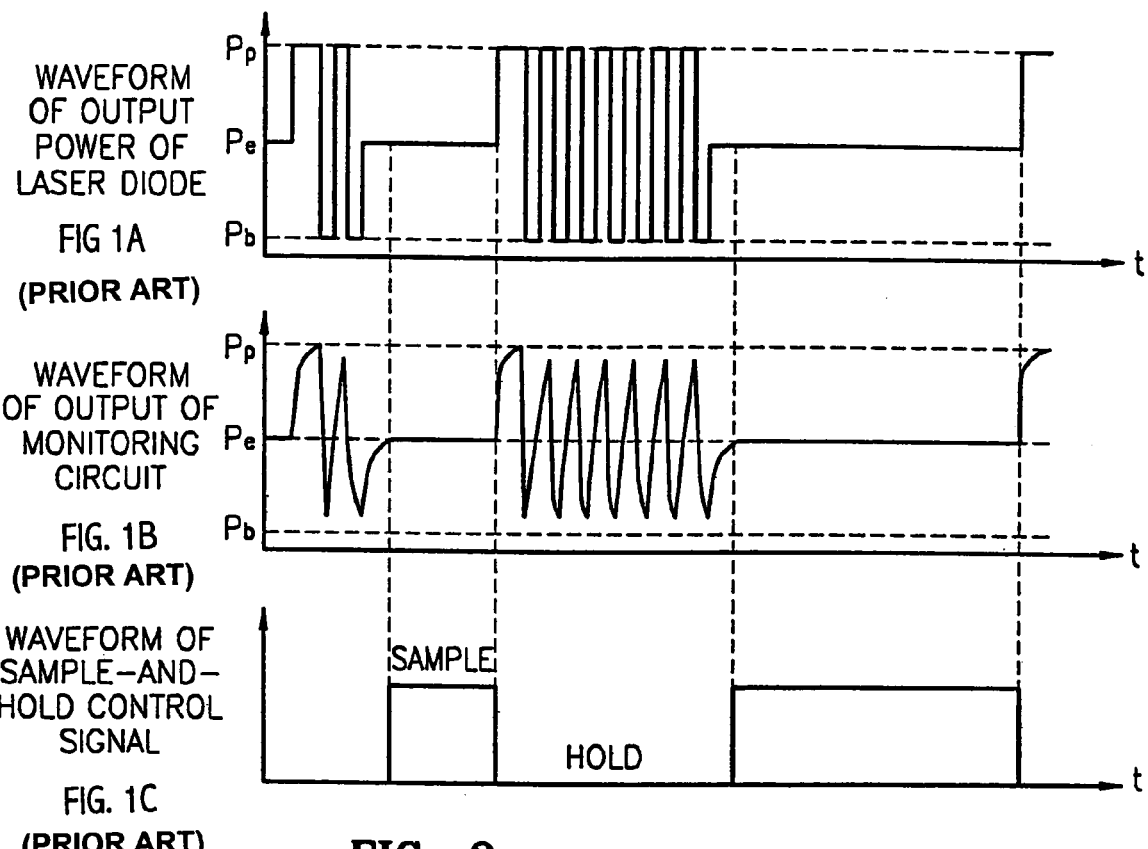
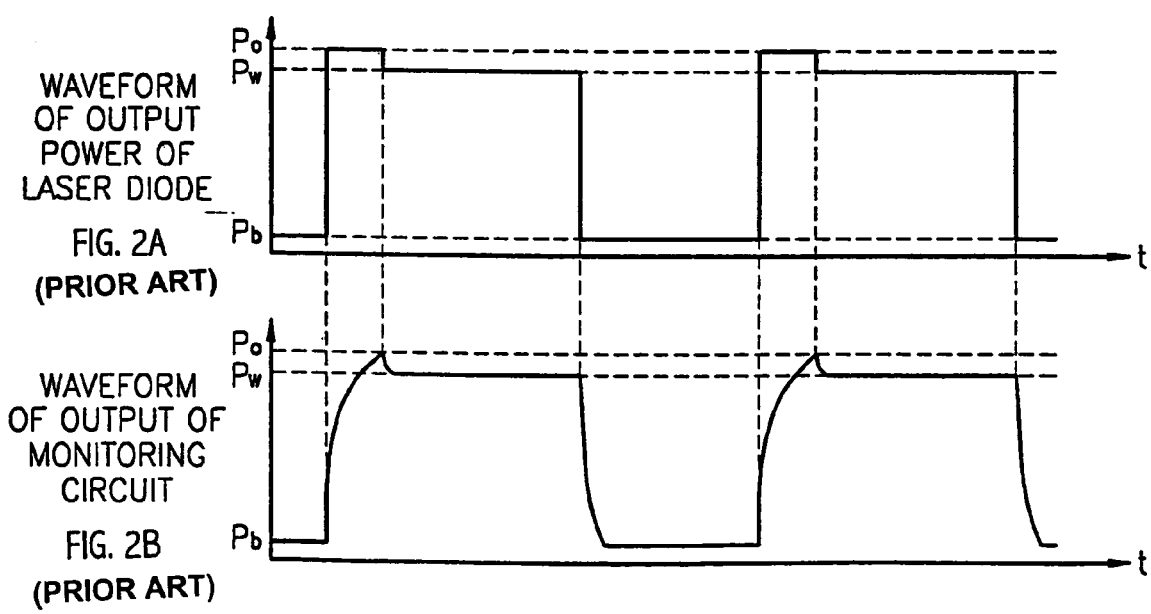

ably receives the laser light radiated from the laser diode 15 and outputs a current proportional to the intensity of the received laser light. A monitoring

LASER POWER CONTROL DEVICE

CROSS-REFERENCE TO RELATED APPLICATIONS

This application claims priority from Korean Patent Application No. 2002-70057, filed on Nov. 12, 2002, in the Korean Intellectual Property Office, the disclosure of which is incorporated herein in its entirety by reference.

BACKGROUND OF THE INVENTION

1. Field of the Invention

The present invention relates to a laser power control device, and more particularly, to a laser power control device for use in an optical recording and/or reproducing apparatus, which can accurately control peak power of a laser diode.

2. Description of the Related Art

In general, a laser diode is used as a light source for the optical pick-up device of an optical recording and/or reproducing apparatus such as a CD player, a recordable CD (CD-R) drive, or a rewritable CD (CD-RW) drive. To assure the smooth operation of the optical recording and/or reproducing apparatus, the power of the laser diode must be maintained at a specified level. Control over the power of the laser diode is needed, since the power of the laser diode may significantly change with changes in the ambient temperature or aging of the laser diode.

In order to control the power of the laser diode, the difference between a present power of the laser diode and a desired power of the laser diode has to be compensated for. A photodiode is used to measure the present power of the laser diode, partially receiving laser light radiated from the laser diode. The photodiode generates a current proportional to the intensity of the received laser light. The generated current is converted into voltage by a monitoring circuit, which functions as a current-to-voltage conversion circuit and is connected to the photodiode. This voltage is used as an input reflecting the present power of the laser diode.

Based on the type of the optical disk, the laser diode uses one of a pulse train method and a single pulse method to radiate light to record data onto an optical disk.

FIGS. 1A-1C relate to the pulse train method used in a CD-RW and a rewritable DVD (DVD-RW) drive. In the pulse train method, the laser diode eliminates previously recorded data from the optical disk by radiating an elimination power $P_e$ on each space part between the pits of the optical disk, and forms a pit in the mark part of the optical disk by alternatively radiating on the optical disk a maximum power, i.e., a peak power $P_p$, and a minimum power, i.e., a bias power $P_b$, at high speeds. The first peak interval of each marked part is longer than other intervals in order to appropriately heat dyes coated on the optical disk.

As shown in the waveform of FIG. 1B, (a waveform which represents the output of a monitoring circuit ) the output waveform from the mark part does not accurately keep up with the output power waveform of the laser diode. This is because the output power of the laser diode is modulated at high speeds, while the response characteristic of the monitoring circuit is slower than the modulation of the laser diode.

FIGS. 2A-2B relates to the single pulse method used in a CD-R drive. In the single pulse method, the laser diode radiates bias power $P_b$ on the space part, overdrive power $P_o$ on the initial part of the mark part, which helps to heat dyes coated on the optical disk appropriately, and write power $P_w$ on the other part of the mark part, in which $P_w < P_o$. According to the single pulse method of FIGS. 2A-2B, the output waveform of the monitoring circuit keeps up with the output power waveform of the laser diode in the space part and the mark part, in contrast to the pulse train method. This is because the output power of the laser diode is not modulated at high speeds.

FIG. 3 is a block diagram of a conventional laser power control device that controls the power of the laser diode according to the pulse train method.

A laser diode 15 radiates the laser light onto the optical disk. A photodiode 1 partially receives the laser light radiated from the laser diode 15 and outputs a current proportional to the intensity of the received laser light. A monitoring circuit 2 converts the current output from the photodiode 1 into a voltage. A sample-and-hold circuit 3 samples and holds the output of the monitoring circuit 2. An analog-to-digital (A/D) conversion circuit 4 converts the output of the sample-and-hold circuit 3 into a digital output. A calculation circuit 5 processes the output of the A/D conversion circuit 4. Digital-to-analog (D/A) conversion circuits 6, 7, and 8 convert the output of the calculation circuit 5 into analog outputs. Current sources 9, 10, and 11 are controlled by the outputs of the D/A conversion circuits 6, 7, and 8, respectively. A switch 12 performs a switching operation between the current source 9 and the laser diode 15. A switch 13 performs a switching operation between the current source 10 and the laser diode 15. A switch 14 performs a switching operation between the current source 11 and the laser diode 15.

The current source 9 supplies a laser driving current corresponding to the bias power $P_b$, i.e., a bias power current $I_b$, to the laser diode 15. The current source 10 supplies a laser driving current corresponding to the elimination power $P_e$, i.e., an elimination power current $I_e$, to the laser diode 15. The current source 11 supplies a laser driving current corresponding to the peak power $P_p$, i.e., a peak power current $I_p$, to the laser diode 15.

As shown in FIG. 1, the laser diode 15 alternatively radiates the peak power $P_p$ and the bias power $P_b$, during a short time interval to form the pit in the mark part of the optical recording medium. The peak power $P_p$ is generated when the switch 14 is switched on, and the switches 12 and 13 are switched off. The bias power $P_b$ is generated when the switch 12 is switched on, and the switches 13 and 14 are switched off. When the laser diode 15 radiates the elimination power $P_e$ on each space part to eliminate recorded data, the switch 13 is switched on, and the switches 12 and 14 are switched off. The switching operations of the switches 12, 13, and 14 are performed in response to input of a control signal SW, which corresponds to the data recording signal input to the laser diode driving integrated circuit (IC) (not shown) of the laser diode 15.

Hereinafter, the operation of the laser power control device of FIG. 3 will be described.

The photodiode 1 partially receives the laser light radiated from the laser diode 15 and outputs a current proportional to the intensity of the received laser light. The monitoring circuit 2 converts the output current into a voltage.

The output signal of the monitoring circuit 2 is input to the sample-and-hold circuit 3 that operates according to the sample-and-hold control signal shown as the third waveform of FIG. 1. As a result, the A/D conversion circuit 4 can detect the level of the present elimination power Pe.

The A/D conversion circuit 4 converts the level of the elimination power $P_e$ into a digital output. The calculation circuit 5 processes the digital output and provides digital outputs to the D/A ($I_b$) conversion circuit 6, the D/A ($I_e$)

conversion circuit 7, and the D/A ($I_p$) conversion circuit 8. Thus, the bias power current $I_b$, the elimination power current $I_e$, and the peak power current $I_p$ are set to control the bias power $P_b$, the elimination power $P_e$, and the peak power $P_p$.

The D/A ($I_b$) conversion circuit 6, the D/A ($I_e$) conversion circuit 7, and the D/A ($I_p$) conversion circuit 8 control the bias power $P_b$, the elimination power $P_e$, and the peak power $P_p$ as follows. The A/D conversion circuit 4 detects the level of the elimination power Pe output from the sample-and-hold circuit 3 and sends output to the calculation circuit 5. Considering the detected digital value of the elimination power $P_e$, the calculation circuit 5 provides a new digital value to the D/A ($I_e$) conversion circuit 7 to increase or decrease the output of the D/A ($I_e$) conversion circuit 7 to generate a desired elimination power. Also, the calculation circuit 5 provides digital output to the D/A ($I_b$) conversion circuit 6 and the D/A ($I_p$) conversion circuit 8. The digital output for each of these circuits is obtained by multiplying the digital output provided to the D/A ($I_e$) conversion circuit 7 by a number. The digital output to be provided to the D/A ($I_b$) conversion circuit 6 is obtained by multiplying the digital output provided to the D/A ($I_e$) conversion circuit 7 by a value $P_b/P_e$. The digital output provided to the D/A ($I_p$) conversion circuit 8 is obtained by multiplying the digital value provided to the D/A ($I_e$) conversion circuit 7 by a value $P_p/P_e$.

However, the conventional laser power control device has problems because, in addition to elimination power current ($I_e$), bias power ($P_b$) and peak power ($P_p$) are also controlled based on the detected level of elimination power ($P_e$).

Since the detected level of elimination power ($P_e$) may reflect noise, and thus, a value different from the original level of elimination power ($P_e$) may be input to the calculation circuit 5. In this case, the digital output provided to the D/A ($I_e$) conversion circuit 7 and the elimination power current ($I_e$) generated from the current source 10 may be erroneous. In the case described above, elimination power ($P_e$) is not significantly affected because noise is minimal. Yet, the digital output provided to the D/A ($I_p$) conversion circuit 8, obtained by multiplying the digital value provided to the D/A ($I_e$) conversion circuit 7 by the value $P_p/P_e$, may have an error multiplied by the value $P_p/P_e$. As a result, this error significantly affects the elimination power $P_e$, which prevents normal control of the peak power $P_p$.

In the conventional laser power control device, it is assumed that the current sources 10 and 11 have the same characteristic. That is, if the inputs to the current sources 10 and 11 are the same, the outputs thereof are assumed to be the same. In other words, it is assumed that if a current, obtained by multiplying the input to the current source 10 by the value $P_p/P_e$, is provided to the current source 11, peak power $P_p$, which is $P_p/P_e$ times the elimination power $P_e$, is obtained. However, variations among the current sources 9, 10, and 11 exist, such that the current sources 9, 10, and 11 output different currents even if the same input is provided thereto. As a result, even if the input to the current source 10 multiplied by the value $P_p/P_e$ is input to the current source 11, the ratio of the peak power $P_p$ output from the current source 11 is not equal to the input elimination power $P_e$, which prevents normal control of the peak power $P_p$.

If no strict requirement exists for the range of the peak power $P_p$, the conventional laser power control device does not exhibit any problem. However, with the advent of new optical recording media such as DVD-RWs, the requirement for the range of the peak power $P_p$ becomes stricter, and the conventional laser power control device cannot satisfy such strict requirements.

SUMMARY OF THE INVENTION

The present invention provides a laser power control device capable of exactly controlling peak power in addition to elimination power.

The present invention also provides a laser power control device capable of exactly controlling peak power even when the level of elimination power reflects noise.

The present invention also provides a laser power control device capable of exactly controlling peak power even when there is variation between current sources, each source providing elimination power current and peak power current to a laser diode.

Additional aspects and/or advantages of the invention will be set forth in part in the description which follows and, in part, will be obvious from the description, or may be learned by practice of the invention.

According to an aspect of the present invention, there is provided a laser power control device for use in an optical recording and/or reproducing apparatus that records data on and/or reproduces data from an optical recording medium by driving a laser diode with a laser diode driver. The device includes: a peak power monitor which monitors a peak power by a sample-and-hold operation, the peak power being output by the laser diode when the pits are formed in the optical recording medium; an elimination power monitor which monitors an elimination power by the sample-and-hold operation, the elimination power being output by the laser diode when a space between the pits of the optical recording medium is formed; a peak power setter which sets a peak power in the laser diode driver based the peak power monitor; an elimination power setter which sets an elimination power in the laser diode driver based on the elimination power monitor; and a bias power setter which sets a bias power in the laser diode driver based on the monitoring results of the peak power monitor and the elimination power monitor.

According to another aspect of the present invention, there is provided a laser power control device for use in an optical recording and/or reproducing apparatus that records data on and/or reproduces data from an optical recording medium by using a laser diode. The device includes: a photodiode which receives light radiated from the laser diode and outputs a current; a current-to-voltage converter which converts the current into a voltage and outputs the voltage; a peak-holder which peak-holds the voltage and outputs the peak-held voltage when pits are formed on the optical recording medium, and outputs the voltage without peak-holding when a space between pits of the optical recording medium is formed; a first sampler-and-holder which samples and holds an output of the peak-holder, and outputs a voltage corresponding to peak power; a second sampler-and-holder which samples and holds an output of the peak-holder, and outputs a voltage corresponding to elimination power; a peak current setter which sets a peak current that flows into the laser diode; an elimination current setter which sets an elimination current that flows into the laser diode; a bias current setter which sets a bias current that flows into the laser diode; and a calculator which calculates setting values of the peak current, the elimination current, and the bias current, based on the voltage corresponding to the peak power and the voltage corresponding to the elimination power.

According to still another aspect of the present invention, there is provided a laser power control device for use in an optical recording and/or reproducing apparatus that records data on and/or reproduces data from an optical recording medium by using a laser diode. The device includes: a photodiode which receives light radiated from the laser diode and outputs a current; a current-to-voltage converter which converts the current into a voltage and outputs the voltage; a peak-holder which peak-holds the voltage and outputs the peak-held voltage when pits are formed, and outputs the voltage without peak-holding when a space between pits of the optical recording medium is formed; a first sampler-and-holder means which samples and holds the output of the peak-holder, and outputs a voltage corresponding to a peak power; a second sampler-and-holder which samples and holds the output of the peak-holder, and outputs a voltage corresponding to an elimination power; a peak power reference voltage setter which sets a peak power reference voltage; an elimination power reference voltage setter which sets an elimination power reference voltage; a first error amplifier which compares the output voltage of the first sampler-and-holder with the peak power reference voltage, amplifies an error thereof, and drives a current source used by the laser diode to generate peak power; a second error amplifier which compares the output voltage of the second sampler-and-holder with the elimination power reference voltage, amplifies an error thereof, and drives a current source used by the laser diode to generate elimination power; and a calculator which outputs a setting value that controls a current source used by the laser diode to generate bias power, based on outputs of the first error amplifier and the second error amplifier.

According to still another aspect of the present invention, there is provided a laser power control device usable in an optical recording and/or reproducing apparatus that records data onto an optical recording medium by using a laser diode that operates according to a single pulse method or a pulse train method, based on type of the optical recording medium. The device includes: a photodiode which receives a light radiated from the laser diode and outputs a current; a current-to-voltage converter which converts the current into a voltage and outputs the voltage; a peak-holder which peak-holds the voltage when pits are formed and outputs the peak-held voltage, and outputs the output voltage when a space between pits of the optical recording medium is formed; an output selector which selectively outputs one of an output of the current-to-voltage conversion means and an output processed by the peak-holder, based on the type of the optical recording medium; a first sampler-and-holder which samples and holds the output of the output selector, and outputs a first voltage; a second sampler-and-holder which samples and holds the output of the output selector, and outputs a second voltage; a first current setter which sets a first current that flows into the laser diode; a second current setter which sets a second current that flows into the laser diode; a third current setter which sets a third current that flows into the laser diode; and a calculator which calculates setting values of the first current, the second current, and the third current, based on the first voltage and the second voltage.

According to yet another aspect of the present invention, there is provided a control method of a laser power device used in an optical recording and/or reproducing apparatus that records data on and/or reproduces data from an optical recording medium by driving a laser diode with a laser diode driver. The method includes: monitoring a peak power by a sample-and-hold operation, the peak power being output by the laser diode when pits are formed in the optical recording medium; monitoring an elimination power by the sample-and-hold operation, the elimination power being output by the laser diode when a space between pits of the optical recording medium is formed; setting a peak power in the laser diode driver based on the peak power monitoring; setting an elimination power in the laser diode driver based on the elimination power monitoring; and setting a bias power in the laser diode driver based on the monitoring results of the peak power monitoring and the elimination power monitoring.

According to yet another aspect of the present invention, there is provided a control method of a laser power control device for use in an optical recording and/or reproducing apparatus that records data on and/or reproduces data from an optical recording medium by using a laser diode. The method includes: receiving light radiated from the laser diode and outputting a current; current-to-voltage converting of the current output by the receiving and outputting the voltage; peak-holding of the voltage and outputting a peak-held voltage when pits are formed, and outputting the voltage without peak-holding when a space between pits of the optical recording medium is formed; first sampling-and-holding of an output by the peak-holding, and outputting a voltage corresponding to peak power; second sampling-and-holding of an output of the peak-holding, and outputting a voltage corresponding to elimination power; setting a peak current that flows into the laser diode; setting an elimination current that flows into the laser diode; setting a bias current that flows into the laser diode; and calculating setting values of the peak current setting, the elimination current setting, and the bias current setting, based on the voltage corresponding to the peak power and the voltage corresponding to the elimination power.

According to yet another aspect of the present invention, there is provided a control method of a laser power control device for use in an optical recording and/or reproducing apparatus that records data on and/or reproduces data from an optical recording medium by using a laser diode. The method includes: receiving light radiated from the laser diode and outputting a current; converting the current into a voltage and outputting the voltage; peak-holding the voltage and outputting the peak-held voltage when pits are formed, and outputting the voltage without peak-holding when a space between pits of the optical recording medium is formed; first sampling-and-holding the output of the peak-holding, and outputting a voltage corresponding to a peak power; second sampling and holding the output of the peak-holding, and outputting a voltage corresponding to an elimination power; setting a peak power reference voltage; setting an elimination power reference voltage; first error amplifying by comparing the output voltage of the first sampling-and-holding with the peak power reference voltage, amplifying an error thereof, and driving a current source used by the laser diode to generate peak power; second error amplifying by comparing the output voltage of the second sampling-and-holding with the elimination power reference voltage, amplifying an error thereof, and driving a current source used by the laser diode to generate elimination power; and calculating by outputting a setting value that controls a current source used by the laser diode to generate bias power, based on outputs of the first error amplifier and the second error amplifier.

According to yet another aspect of the present invention, there is provided a control method of a laser power control device for use in an optical recording and/or reproducing apparatus that records data onto an optical recording medium by using a laser diode that operates according to a single pulse method or a pulse train method, based on type of the optical recording medium. The method includes: receiving a light radiated from the laser diode and outputting a current; converting the current into a voltage and outputting the voltage; peak-holding the voltage when pits are formed and outputting the peak-held voltage, and outputting the voltage when a space between pits of the optical recording medium is formed; selectively outputting one of an output of the converting and an output by the peak-holding means, based on the type of the optical recording medium; first sampling and holding the output of the selective outputting, and outputting a first voltage; second sampling and holding the output of the selective outputting, and for outputting a second voltage; setting a first current that flows into the laser diode; setting a second current that flows into the laser diode; setting a third current that flows into the laser diode; and calculating setting values of the first current, the second current, and the third current, based on the first voltage and the second voltage.

According to yet another aspect of the present invention, there is provided a laser power control device which is used in an optical recording and/or reproducing apparatus that records data on and/or reproduces data from an optical recording medium by driving a laser diode with a laser diode driving means. The laser power control device includes a peak power monitoring means for monitoring a peak power by a sample-and-hold operation, the peak power being output by the laser diode when pits are formed in the optical recording medium; an elimination power monitoring means for monitoring an elimination power by the sample-and-hold operation, the elimination power being output by the laser diode when a space between pits of the optical recording medium is formed; a peak power setting means for setting a peak power in the laser diode driving means based on a monitoring result of the peak power monitoring means; an elimination power setting means for setting an elimination power in the laser diode driving means based on a monitoring result of the elimination power monitoring means; and a bias power setting means for setting a bias power in the laser diode driving means based on the monitoring results of the peak power monitoring means and the elimination power monitoring means.

According to yet another aspect of the present invention, there is provided a laser power control device which is used in an optical recording and/or reproducing apparatus that records data on and/or reproduces data from an optical recording medium by using a laser diode. The laser power control device includes a photodiode which receives light radiated from the laser diode and outputs a current; a current-to-voltage conversion means for converting the current into a voltage and for outputting the voltage; a peak-hold means for peak-holding the voltage and for outputting the peak-held voltage when pits of the optical recording medium are formed, and for outputting the voltage without peak-holding when a space between pits is formed; a first sample-and-hold means for sampling and holding an output of the peak-hold means, and for outputting a voltage corresponding to a peak power; a second sample-and-hold means for sampling and holding an output of the peak-hold means, and outputs a voltage corresponding to an elimination power; a peak current setting means for setting a peak current that flows into the laser diode; an elimination current setting means for setting an elimination current that flows into the laser diode; a bias current setting means for setting a bias current that flows into the laser diode; and a calculation means for calculating setting values of the peak current, the elimination current, and the bias current, based on the voltage corresponding to the peak power and the voltage corresponding to the elimination power.

According to yet another aspect of the present invention, there is provided a laser power control device which is used in an optical recording and/or reproducing apparatus that records data on and/or reproduces data from an optical recording medium by using a laser diode. The laser power control device includes a photodiode which receives light radiated from the laser diode and outputs a current; a current-to-voltage conversion means for converting the current into a voltage and for outputting the voltage; a peak-hold means for peak-holding the voltage and for outputting the peak-held voltage when pits are formed, and for outputting the voltage without peak-holding when a space between pits of the optical recording medium is formed; a first sample-and-hold means for sampling and holding the output of the peak-hold means, and for outputting a voltage corresponding to a peak power; a second sample-and-hold means for sampling and holding the output of the peak-hold means, and for outputting a voltage corresponding to an elimination power; a peak power reference voltage setting means for setting a peak power reference voltage; an elimination power reference voltage setting means for setting an elimination power reference voltage; a first error amplifier which compares the output voltage of the first sample-and-hold means with the peak power reference voltage, amplifies an error thereof, and drives a current source used by the laser diode to generate peak power; a second error amplifier which compares the output voltage of the second sample-and-hold means with the elimination power reference voltage, amplifies an error thereof, and drives a current source used by the laser diode to generate elimination power; and a calculation means for outputting a setting value that controls a current source used by the laser diode to generate bias power, based on outputs of the first error amplifier and the second error amplifier.

According to yet another aspect of the present invention, there is provided a laser power control device which is used in an optical recording and/or reproducing apparatus that records data onto an optical recording medium by using a laser diode that operates according to a single pulse method or a pulse train method, based on type of the optical recording medium. The laser power control device includes a photodiode which receives a light radiated from the laser diode and outputs a current; a current-to-voltage conversion means for converting the current into a voltage and for outputting the voltage; a peak-hold means for peak holding the voltage when pits are formed and for outputting the peak-held voltage, and for outputting the voltage when a space between pits of the optical recording medium is formed; an output selection means for selectively outputting one of an output of the current-to-voltage conversion means and an output processed by the peak-hold means, based on the type of the optical recording medium; a first sample-and-hold means for sampling and holding the output of the output selection means, and for outputting a first voltage; a second sample-and-hold means for sampling and holding the output of the output selection means, and for outputting a second voltage; a first current setting means for setting a first current that flows into the laser diode; a second current setting means for setting a second current that flows into the laser diode; a third current setting means for setting a third current that flows into the laser diode; and a calculation means for calculating setting values of the first current, the second current, and the third current, based on the first voltage and the second voltage.

BRIEF DESCRIPTION OF THE DRAWINGS

These and/or other aspects and advantages of the invention will become apparent and more readily appreciated from the following description of the embodiments, taken in conjunction with the accompanying drawings of which:

FIGS. 1A-1C illustrate waveforms for explaining the operation of a conventional laser power control device;

FIGS. 2A-2B illustrate waveforms related to the single pulse method used in a CD-R drive;

DETAILED DESCRIPTION OF THE PREFERRED EMBODIMENTS

Figure 3:
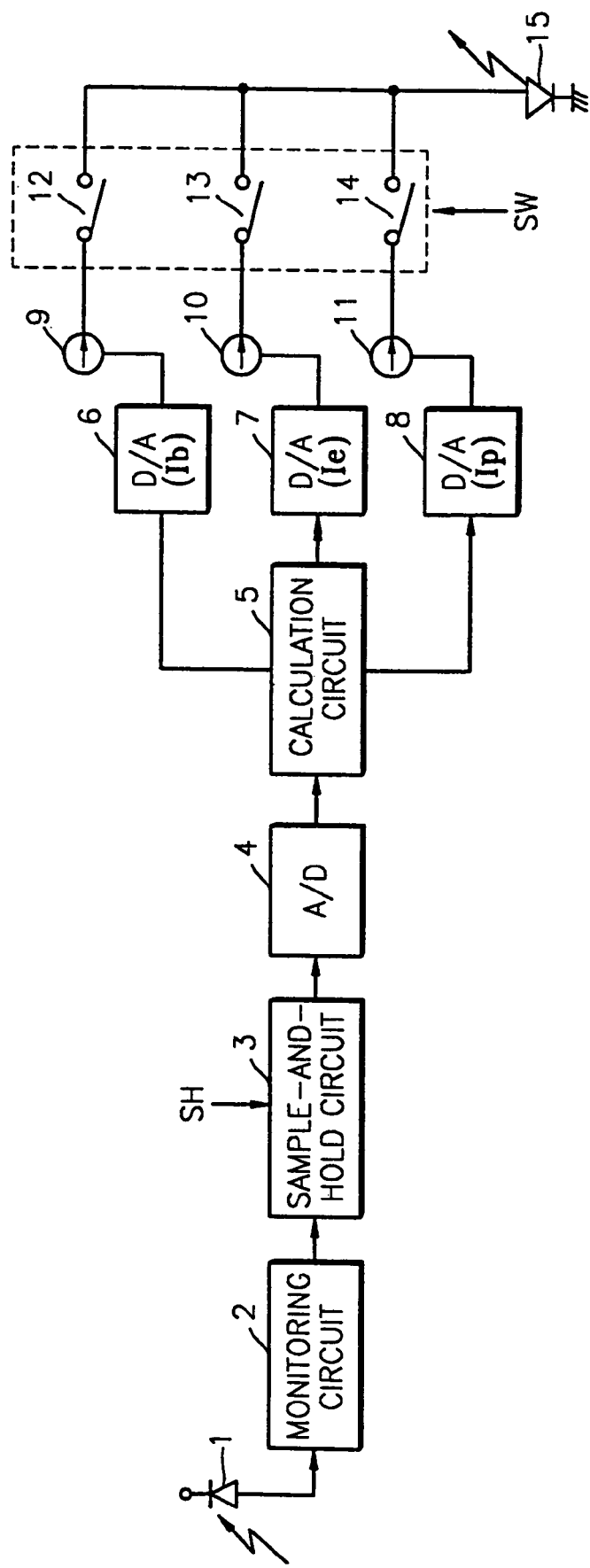
FIG. 3 is a block diagram of the conventional laser power control device.

Reference will now be made in detail to embodiments of the present invention, examples of which are illustrated in the accompanying drawings, wherein like reference numerals refer to the like elements throughout. The embodiments are described below to explain the present invention by referring to the figures.

The present invention will now be described more fully with reference to the accompanying drawings, in which preferred embodiments of the invention are shown.

Figure 4:
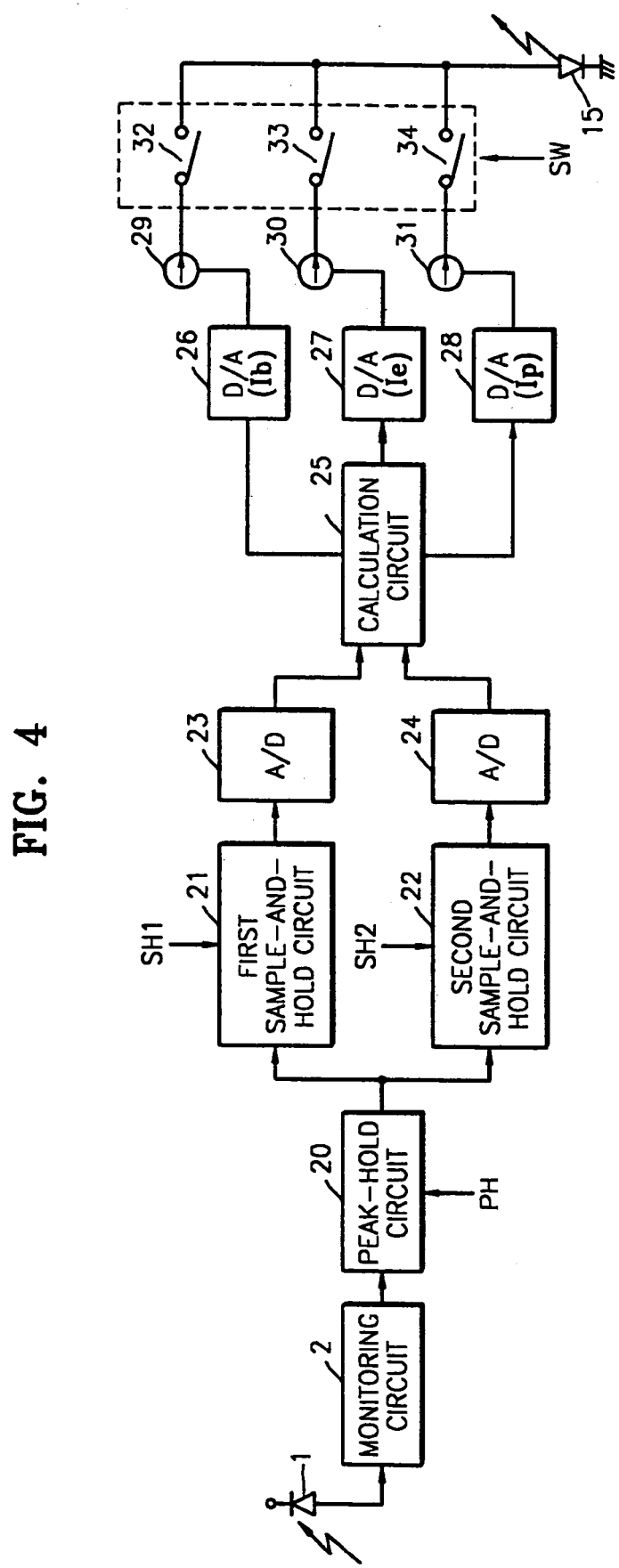
FIG. 4 is a block diagram of a laser power control device according to an embodiment of the present invention.

FIG. 4 is a block diagram of a laser power control device according to an embodiment of the present invention. A laser diode 15 radiates a laser light onto an optical recording medium. A photodiode 1 receives the laser light radiated from the laser diode 15. A monitoring circuit 2 monitors the output of the photodiode 1 and converts the output into a voltage. A peak-hold circuit 20 outputs the output voltage of the monitoring circuit 2 after peak-holding the output voltage in the mark part, in which the pit is formed, and outputs the output voltage of the monitoring circuit 2 without peak-holding in the space part, in which the elimination power $P_e$ is radiated to eliminate (i.e., erase) recorded data. A first sample-and-hold circuit 21 samples and holds the peak-held output voltage of the peak-hold circuit 20 in the mark part, i.e., the voltage corresponding to the peak power $P_p$. A second sample-and-hold circuit 22 samples and holds the output voltage of the peak-hold circuit 20 in the space part, i.e., the voltage corresponding to the elimination power $P_e$. A/D conversion circuits 23 and 24 convert the outputs of the first sample-and-hold circuit 21 and the second sample-and-hold circuit 22 into digital outputs, respectively. A calculation circuit 25 performs calculation on the digital outputs of the A/D conversion circuits 23 and 24. A D/A conversion circuit 26 converts the output of the calculation circuit 25 into an analog output. A D/A conversion circuit 27 converts the output of the calculation circuit 25 into an analog output. A D/A conversion circuit 28 converts the output of the calculation circuit 25 into an analog output. Current sources 29, 30, and 31 are controlled by the outputs of the D/A conversion circuits 26, 27, and 28, respectively.

Switches 32, 33, and 34 perform switching operations, respectively, between the current sources 29, 30, and 31 and the laser diode 15.

The photodiode 1, the monitoring circuit 2, the peak-hold circuit 20, the first sample-and-hold circuit 21, and the A/D conversion circuit 23 constitute a peak power monitor which monitors the peak power output from the laser diode 15, when data is recorded by forming pits on an optical recording medium.

The photodiode 1, the monitoring circuit 2, the peak-hold circuit 20, the second sample-and-hold circuit 22, and the A/D conversion circuit 24 constitute an elimination power monitor which monitors the elimination power output from the laser diode 15, when data is eliminated by radiating elimination power Pe to a space part between the pits.

The D/A conversion circuits 26, 27, and 28, the current sources 29, 30, and 31, and the switches 32, 33, and 34 constitute a laser diode driver that drives the laser diode 15.

A peak power setter, implemented by the calculation circuit 25, sets the peak power $P_p$ in the laser diode driver based on the monitoring result of the peak power monitoring means. An elimination power setter, implemented by the calculation circuit 25, sets the elimination power $P_e$ in the laser diode driver based on the monitoring result of the elimination power monitor. A bias power setter, implemented by the calculation circuit 25, sets the bias power $P_b$ in the laser diode driver based on the monitoring results of the peak power monitor and the elimination power monitor.

Hereinafter, the operation of the laser power control device of FIG. 4 will be described.

The photodiode 1 generates an optical current after partially receiving the laser light radiated from the laser diode 15. The monitoring circuit 2 converts the optical current into a voltage.

When data is recorded onto the optical recording medium, the output power of the laser diode 15 is modulated into bias power $P_b$, elimination power $P_e$, and peak power $P_p$. The bias power $P_b$ is controlled by a bias current $I_b$. The elimination power $P_e$ is controlled by an elimination current $I_e$. The peak power $P_p$ is controlled by a peak current $I_p$.

Figure 5:
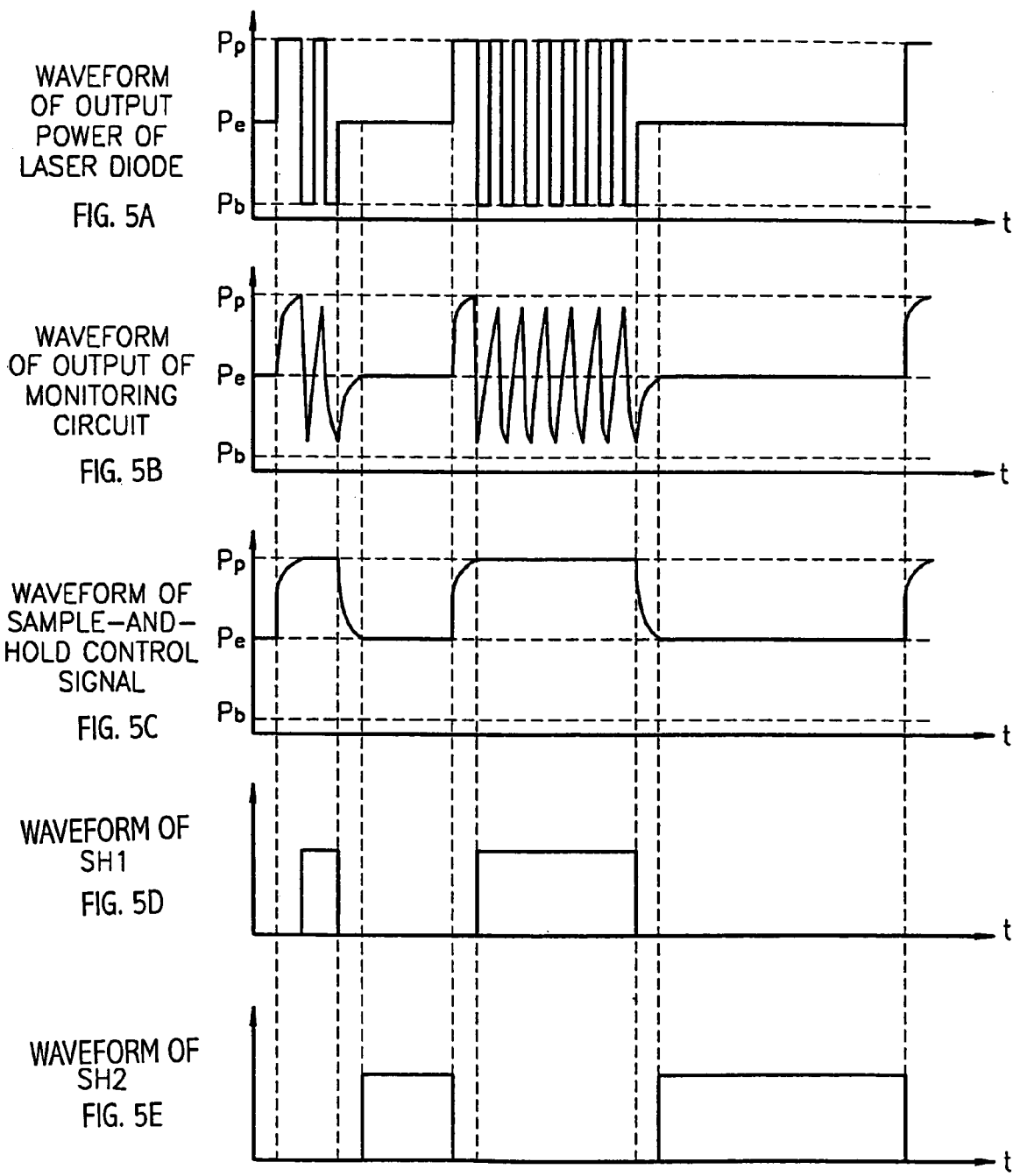
FIGS. 5A-5E illustrate waveforms for explaining the operation of the laser power control device according to the present invention.

If the output power waveform of the laser diode 15 is the same as the waveform of FIG. 5A, the output waveform of the monitoring circuit 2 is the same as the waveform of FIG. 5B. The response characteristic of the monitoring circuit 2 slows down the output response and weakens the output signal.

The peak-hold circuit 20 processes the output voltage of the monitoring circuit 2. The peak-hold circuit 20 outputs the output of the monitoring circuit 2 after peak-holding the output voltage of the monitoring circuit 2 in the mark part, which is formed by alternatively radiating the peak power $P_p$ and the bias power $P_b$ at high speeds, i.e., when the pit is formed in the optical recording medium, and outputs the output voltage of the monitoring circuit 2 without peak-holding in the space part in which elimination power $P_e$ is radiated to eliminate recorded data. The peak-hold circuit 20 is set or reset in response to a control signal PH. As a result, the output waveform of the peak-hold circuit 20 is the same as the waveform of FIG. 5C. As shown in the waveform of FIG. 5C, the output waveform of the peak-hold circuit 20 is similar to the waveform of the output of the monitoring circuit 2 in the space part. In the mark part, however, the peak power $P_p$ output from the peak-hold circuit 20 is held for a considerable amount of time.

The first sample-and-hold circuit 21 and the second sample-and-hold circuit 22 process the output of the peak-hold circuit 20. The first sample-and-hold circuit 21 samples and holds a voltage corresponding to the peak power $P_p$ and is controlled by a sample-and-hold control signal SH1, represented by the waveform of FIG. 5D. As shown in FIGS. 5A-5E, the sample-and-hold control signal SH1 directs the first sample-and-hold circuit 21 to sample the part of the output waveform of the peak-hold circuit 20 in which the peak power $P_p$ is held. The second sample-and-hold circuit 22 samples and holds a voltage corresponding to the elimination power $P_e$ and is controlled by a sample-and-hold control signal SH2, represented by the waveform of FIG. 5E. As shown in the waveform of FIG. 5E, the sample-and-hold control signal SH2 directs the second sample-and-hold circuit 22 to sample the part of the output waveform of the peak-hold circuit 20 in which the elimination power $P_e$ is held. The function of the sample-and-hold control signal SH2 is similar to the conventional sample-and-hold control signal SH, represented by the waveform of FIG. 1C.

The first sample-and-hold circuit 21 and the second sample-and-hold circuit 22 output voltage corresponding to the present peak power $P_p$ and voltage corresponding to the present elimination power $P_e$, respectively. In other words, the level of the present peak power $P_p$ and the level of the present elimination power $P_e$ are obtained. The calculation circuit 25 increases or decreases the output of the D/A ($I_p$) conversion circuit 28 to maintain a desired peak power $P_p$. Control is determined with reference to the level of the present peak power $P_p$, output from the first sample-and-hold circuit 21 and detected by the A/D conversion circuit 23. Also, the calculation circuit 25 increases or decreases the output of the D/A ($I_e$) conversion circuit 27 to maintain a desired elimination power $P_e$. Control is determined with reference to the level of the present elimination power $P_e$, output from the second sample-and-hold circuit 22 and detected by the A/D conversion circuit 24. At the same time, the calculation circuit 25 sets the output of the D/A ($I_b$) conversion circuit 26, based on increases or decreases in the outputs of the D/A ($I_e$) conversion circuit 27 and the D/A ($I_p$) conversion circuit 28. The calculation circuit 25 sets the output of the D/A ($I_b$) conversion circuit 26, using a relational specification for peak power $P_p$, elimination power $P_e$, and bias power $P_b$, e.g., the ratio of the peak power $P_p$ to elimination power $P_e$, the ratio of elimination power $P_e$ to bias power $P_b$, or the ratio of peak power $P_p$ to bias power $P_b$.

The current sources 29, 30, and 31 are respectively controlled by the outputs of the D/A conversion circuits 26, 27, and 28 and supply the bias current $I_b$, the elimination current $I_e$, and the peak current $I_p$ to the laser diode 15. In response to input of a control signal SW, the switches 32, 33, and 34 are switched on or off. The control signal SW is set based on data to be recorded onto the optical recording medium. For example, if it is necessary to eliminate data by radiating the elimination power $P_e$ to the space part at some moment, a control signal SW directing the switch 33 to be switched on and the others to be switched off is input to the switches 32, 33, and 34.

Figure 6:
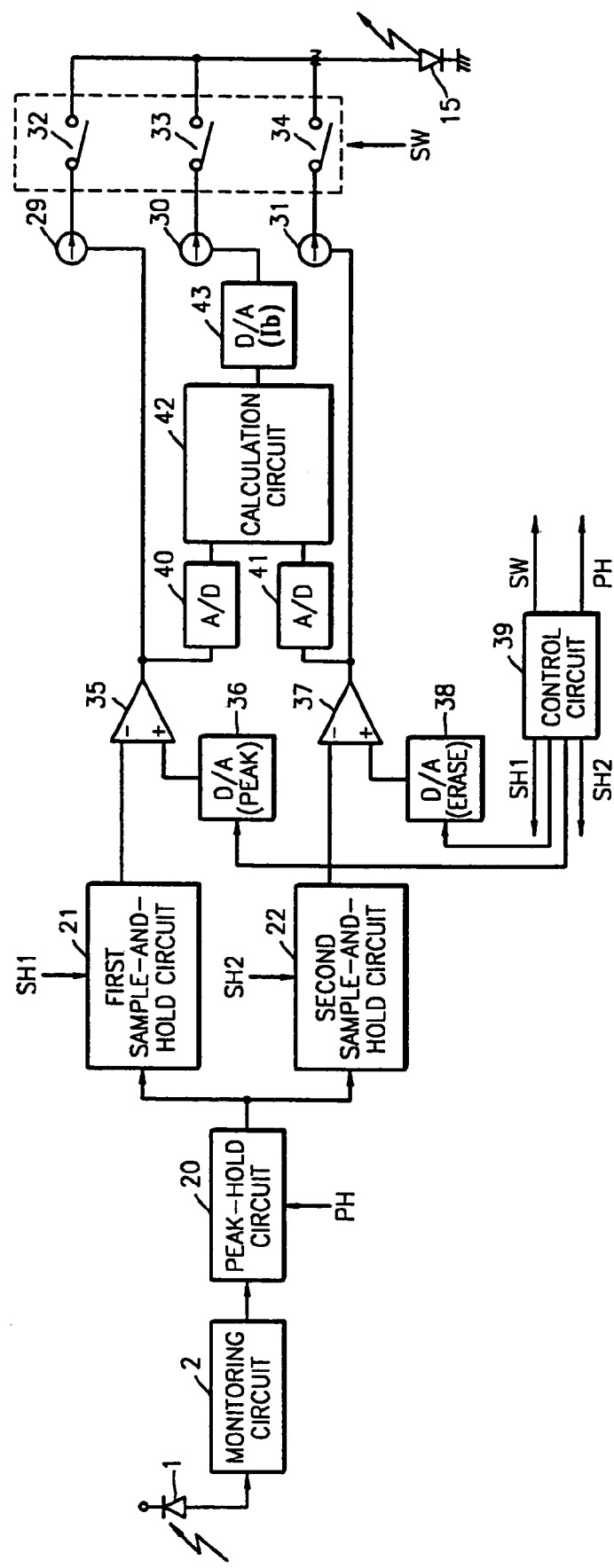
FIG. 6 is a block diagram of a laser power control device according to another embodiment of the present invention.

FIG. 6 is a laser power control device according to another embodiment of the present invention. A laser diode 15 radiates laser light onto an optical recording medium. A photodiode 1 receives the laser light radiated from the laser diode 15. A monitoring circuit 2 monitors the output of the photodiode 1 and converts the output of the photodiode 1 into a voltage. A peak-hold circuit 20 outputs the output voltage of the monitoring circuit 2 after peak-holding the output voltage of the monitoring circuit 2 in the mark part of the optical recording medium, in which the pit is formed, and outputs the output voltage of the monitoring circuit 2 without peak-holing in the space part, in which the elimination power $P_e$ is radiated to eliminate recorded data. A first sample-and-hold circuit 21 samples and holds the peak-held output voltage in the mark part, i.e., the voltage corresponding to the peak power $P_p$. A second sample-and-hold circuit 22 samples and holds the output voltage in the space part, i.e., the voltage corresponding to the elimination power $P_e$. A D/A conversion circuit 36 receives the digital signal corresponding to the peak power reference voltage from a control circuit 39, converts the digital signal into an analog output, and provides the peak power reference voltage to a first error amplifier 35. A D/A conversion circuit 38 receives the digital signal corresponding to the elimination power reference voltage from the control circuit 39, converts the digital signal into an analog output, and provides the elimination power reference voltage to a second error amplifier 37. The first error amplifier 35 compares the output of the first sample-and-hold circuit 21 with the peak power reference voltage, and amplifies the error thereof. The second error amplifier 37 compares the output of the second sample-and-hold circuit 22 with the elimination power reference voltage, and amplifies the error thereof. A/D conversion circuits 40 and 41, convert the outputs of the first error amplifier 35 and the second error amplifier 37, respectively, into digital outputs. A calculation circuit 42 receives the outputs of the A/D conversion circuits 40 and 41 and outputs a setting value used to control current sources 29, 30, and 31, so that the laser diode 15 can generate the bias power $P_b$. A D/A ($I_b$) conversion circuit 43 converts the output of the calculation circuit 42 into an analog output. The current sources 29, 30, and 31 are controlled by the outputs of the first error amplifier 35, the D/A ($I_b$) conversion circuit 43, and the second error amplifier 37, respectively. Switches 32, 33, and 34 perform switching operations between the current sources 29, 30, and 31 and the laser diode 15, respectively.

Hereinafter, the operation of the laser power control device of FIG. 6 will be described.

The photodiode 1 generates an optical current, after partially receiving the laser light radiated from the laser diode 15. The monitoring circuit 2 converts the optical current into a voltage.

When data is recorded onto the optical recording medium, the output power of the laser diode 15 is modulated into the bias power $P_b$, the elimination power $P_e$, and the peak power $P_p$. Bias power $P_b$, elimination power $P_e$, and peak power $P_p$ are radiated onto the optical recording medium. The bias power $P_b$ is controlled by the bias current $I_b$. The elimination power $P_e$ is controlled by the elimination current $I_e$. The peak power $P_p$ is controlled by the peak current $I_p$.

If the output power waveform of the laser diode 15 is the same as the waveform of FIG. 5A, the output waveform of the monitoring circuit 2 is the same as the waveform of FIG. 5B. The response characteristic of the monitoring circuit 2 slows down the output response and weakens the output signal.

The peak-hold circuit 20 processes the output voltage of the monitoring circuit 2. The peak-hold circuit 20 outputs the output voltage of the monitoring circuit 2 after peak-holding the output voltage of the monitoring circuit 2 in the mark part, which is formed by alternatively radiating the peak power $P_p$ and the bias power $P_b$ at high speeds, i.e., when the pit is formed, and outputs the output voltage of the monitoring circuit 2 without peak-holding in the space part, in which the elimination power $P_e$ is radiated to eliminate recorded data. The peak-hold circuit 20 is set or reset in response to a control signal PH. As a result, the output waveform of the peak-hold circuit 20 is the same as the waveform of FIG. 5C. As shown in waveform of FIG. 5C, the output waveform of the peak-hold circuit 20 is the same as the output waveform of the monitoring circuit 2 in the space part. In the mark part, however, the peak power $P_p$ is held for a considerable amount of time. Thus, the sample-and-hold operation is performable on the peak power $P_p$ as follows.

The first sample-and-hold circuit 21 and the second sample-and-hold circuit 22 process the output of the peak-hold circuit 20. The first sample-and-hold circuit 21 samples and holds a voltage corresponding to the peak power $P_p$ and is controlled by a sample-and-hold control signal SH1, represented by the waveform of FIG. 5D. As shown in the waveform of FIG. 5D, the sample-and-hold control signal SH1 directs the first sample-and-hold circuit 21 to sample the part of the output waveform of the peak-hold circuit 20 in which the peak power $P_p$ is held. The second sample-and-hold circuit 22 samples and holds a voltage corresponding to the elimination power $P_e$ and is controlled by a sample-and-hold control signal SH2, represented by the waveform of FIG. 5E. As shown in the waveform of FIG. 5E, the sample-and-hold control signal SH2 directs the second sample-and-hold circuit 22 to sample the part of the output waveform of the peak-hold circuit 20 in which the elimination power $P_e$ is held. The function of the sample-and-hold control signal SH2 is similar to the conventional sample-and-hold control signal SH, represented by the waveform of FIG. 1C. The first sample-and-hold circuit 21 and the second sample-and-hold circuit 22 output the voltage corresponding to the present peak power $P_p$ and the voltage corresponding to the present elimination power $P_e$. In other words, the level of the present peak power $P_p$ and the level of the present elimination power $P_e$ are obtained. The voltages output from the first sample-and-hold circuit 21 and the second sample-and-hold circuit 22 are input to the first error amplifier 35 and the second error amplifier 37, respectively. The other inputs of the first error amplifier 35 and the second error amplifier 37 are provided by to the D/A conversion circuit 36 and the D/A conversion circuit 38, respectively.

The first error amplifier 35 compares the peak power reference voltage supplied by the D/A conversion circuit 36 with the voltage corresponding to the present peak power $P_p$, obtained by the first sample-and-hold circuit 21, amplifies the error thereof, and controls the current source 29 providing the peak power $P_p$. The second amplifier 37 compares the elimination power reference voltage, supplied by the D/A conversion circuit 38, with the voltage corresponding to the present elimination power $P_e$, obtained by the first sample-and-hold circuit 22, amplifies the error thereof, and controls the current source 31 providing the elimination power $P_e$.

The outputs of the first error amplifier 35 and the second error amplifier 37 are also input to the calculation circuit 42 via the A/D conversion circuits 40 and 41, respectively. The calculation circuit 42 calculates a setting value based on the input and outputs the setting value to the D/A ($I_b$) conversion circuit 43, which drives the current source 30 that provides bias power $P_b$ to the laser diode 15.

The calculation circuit 42 sets the output of the D/A ($I_b$) conversion circuit 43, using a relational specification for peak power $P_p$, elimination power $P_e$, and bias power $P_b$, e.g., the ratio of peak power $P_p$ to elimination power $P_e$, the ratio of elimination power $P_e$ to bias power $P_b$, or the ratio of peak power $P_p$ to bias power $P_b$.

The current sources 29, 30, and 31 respectively supply peak current $I_p$, bias current $I_b$, and elimination current $I_e$ to the laser diode 15. In response to input of a control signal SW, the switches 32, 33, and 34 are switched on or off. The control signal SW is set based on data to be recorded onto the optical recording medium. For example, if it is necessary to eliminate data by radiating the elimination power $P_e$ to the space part at some moment, a control signal SW, directing the switch 34 to be switched on and the others to be switched off, is input to the switches 32, 33, and 34.

As described above, based on the type of optical recording medium, the laser diode 15 uses one of two methods for radiating laser light to record data onto an optical recording medium. For instance, in CD-RW and DVD-RW drives, the pulse train method is generally used, and in CD-R drives, the single pulse method is used.

According to the single pulse method, as shown in FIGS. 2A-2B, the peak-holding operation is unnecessary because the bias power $P_b$ and the recording power $P_w$ are maintained for a sufficient amount of time. Thus, the output power of the laser diode 15 is controllable by sampling-and-holding the bias power $P_b$ and the recording power $P_w$.

Figure 7:
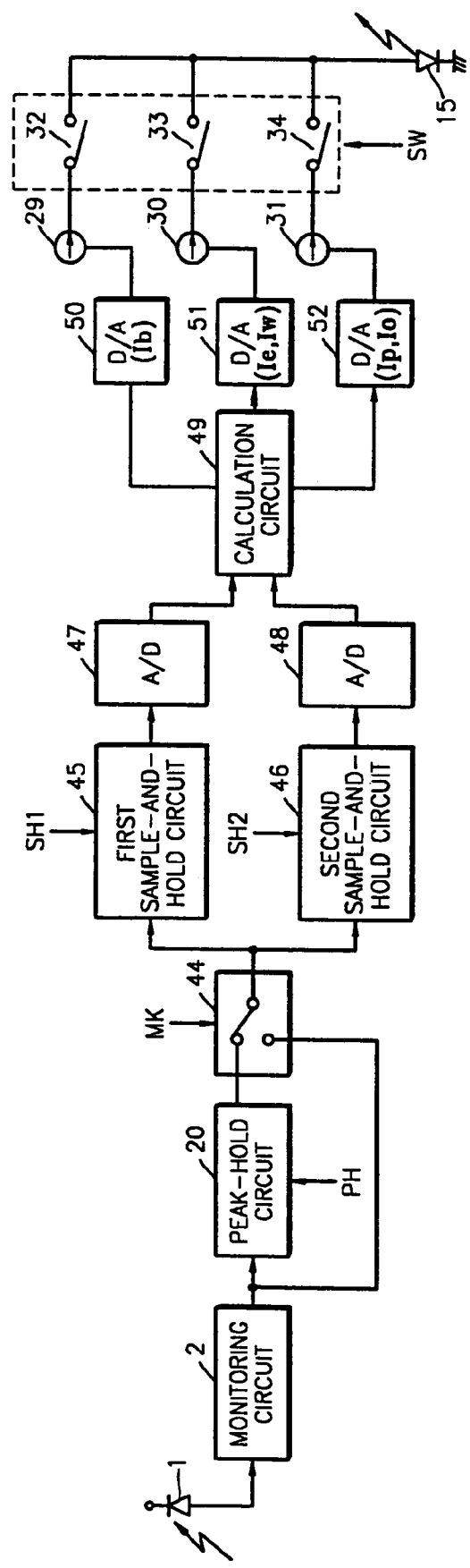
FIG. 7 is a block diagram of a laser power control device according to yet another embodiment of the present invention.

FIG. 7 shows the laser power control device of an optical recording and/or reproducing apparatus, which selectively uses the single pulse method and the pulse train method based on the type of optical recording medium.

A laser diode 15 radiates laser light onto the optical recording medium. A photodiode 1 receives the laser light radiated from the laser diode 15. A monitoring circuit (current-to-voltage conversion circuit) 2 monitors the output of the photodiode 1 and converts the output of the photodiode 1 into a voltage. A peak-hold circuit 20 outputs the output voltage of the monitoring circuit 2 after peak-holding the output voltage of the monitoring circuit 2 in the mark part, which is formed by alternatively radiating peak power $P_p$ and bias power $P_b$, and outputs the output voltage of the monitoring circuit 2 without peak-holding in the space part to which the elimination power $P_e$ is radiated. An output selector 44 selectively outputs either the output of the monitoring circuit 2 or the output processed by the peak-hold circuit 20, based on the type of optical recording medium. A first sample-and-hold circuit 45 samples and holds the output of the output selector 44 and outputs a first voltage. A second sample-and-hold circuit 46 samples and holds the output of the selector 44 and outputs a second voltage. A/D conversion circuits 47 and 48 convert the output of the first sample-and-hold circuit 45 and the second sample-and-hold circuit 46 into digital outputs, respectively. A calculation circuit 49 performs calculation on the outputs of the A/D conversion circuits 47 and 48. A D/A conversion circuit 50 converts the output of the calculation circuit 49 into an analog output. A D/A conversion circuit 51 converts the output of the calculation circuit 49 into an analog output. A D/A conversion circuit 52 converts the output of the calculation circuit 49 into an analog output. Current sources 29, 30, and 31 are respectively controlled by the outputs of the D/A conversion circuits 50, 51, and 52. Switches 32, 33, and 34 perform switching operations between the current sources 29, 30, and 31 and the laser diode 15, respectively.

Hereinafter, the operation of the laser power control device of FIG. 7 will be described.

The output selector 44 selectively outputs either the output of the peak-hold circuit 20 or the output of the monitoring circuit 2, based on a signal MK indicating the type of optical recording medium. If the signal MK indicates that the pulse train method is used, the output selector 44 outputs the output of the peak-hold circuit 20. In this case, the laser power control device of FIG. 7 operates in the same manner as the laser power control device of FIG. 4.

If the signal MK indicates that the single pulse method is used, the output selector 44 outputs the output of the monitoring circuit 2. In this case, the laser power control device of FIG. 7 operates as follows.

The photodiode 1 generates an optical current after partially receives the laser light radiated from the laser diode 15. The monitoring circuit 2 converts the optical current into a voltage.

When data is recorded onto the optical recording medium with the laser diode 15, using the single pulse method, the output power of the laser diode 15 is modulated into an overdrive power $P_o$, a write power $P_w$, and a bias power $P_b$. Overdrive power $P_o$, write power $P_w$, and bias power $P_b$ are radiated onto the optical recording medium. The overdrive power $P_o$ is controlled by an overdrive current $I_o$. The write power $P_w$ is controlled by a write current $I_w$. The bias power $P_p$ is controlled by a bias current $I_b$.

As shown in the waveform of FIG. 2B, both the write power $P_w$ and the bias power $P_b$ are held for a sufficient amount of time. In this case, a sample-and-hold control signal SH1, input to the first sample-and-hold circuit 45, directs the first sample-and-hold circuit 45 to sample the write power $P_w$. A sample-and-hold control signal SH2, input to the second sample-and-hold circuit 46, directs the second sample-and-hold circuit 46 to sample the bias power $P_b$.

The first sample-and-hold circuit 45 and the second sample-and-hold circuit 46 output voltage corresponding to the present write power $P_w$ and the voltage corresponding to the present bias power $P_b$. In other words, the level of the current write power $P_w$ and the level of the current bias power $P_b$ are obtained. The calculation circuit 49 increases or decreases the output of the D/A ($I_e$, $I_w$) conversion circuit 51 to maintain a desired write power $P_w$. Control is performed with reference to the level of the present write power $P_w$ that is output from the first sample-and-hold circuit 45 and detected by the A/D conversion circuit 47. Also, the calculation circuit 49 increases or decreases the output of the D/A ($I_b$) conversion circuit 50 to maintain a desired bias power $P_b$. Control is determined with reference to the level of the current bias power $P_b$ that is output from the second sample-and-hold circuit 46 and detected by the A/D conversion circuit 48. At the same time, the calculation circuit 49 sets the output of the D/A ($I_p$, $I_o$) conversion circuit 52 related to the overdrive current $I_o$, based on increases or decreases in the outputs of the D/A ($I_e$, $I_w$) conversion circuit 51 and the D/A ($I_b$) conversion circuit 50. The calculation circuits 49 sets the output of the D/A ($I_p$, $I_o$) conversion circuit 52 using a relational specification for overdrive power $P_o$, write power $P_w$, and bias power $P_b$, e.g., the ratio of overdrive power $P_o$ to write power $P_w$, the ratio of write $P_w$ to bias power $P_b$, or the ratio of overdrive power $P_o$ to bias power $P_b$.

The current sources 29, 30, and 31 respectively supply the bias current $I_b$, the write current $I_w$, and the overdrive current $I_o$ to the laser diode 15 under the control of the outputs of the D/A conversion circuits 50, 51, and 52. The switches 32, 33, and 34 perform switching operations in response to input of a control signal SW. The control signal SW is set based on data to be recorded onto the optical recording medium.

As described above, in contrast to the conventional laser power control device in which the level of the peak power is obtained in a simple way and only the elimination power is sampled-and-held, the laser power control device of the present invention obtains the level of the peak power by sampling-and-holding the peak power. Thus, the peak power is accurately controllable.

According to the present invention, control of the peak power is not hindered by noise in the elimination power, as is the case in the conventional laser power control device, in which the peak power setting value is calculated by multiplying an elimination power setting value, by a ratio of peak power to elimination power, i.e., $P_p/P_e$, that may be equal to 10 or more.

In addition, since the peak power is set based on the sample-and-held peak power, control of peak power is not affected by the variation between the current source of elimination power current and the current source of peak power current.

Also, the laser power control device with the output selector 44 is useful when the laser diode of the optical recording medium uses different methods to record data.

Although a few embodiments of the present invention have been shown and described, the present invention is not limited to the described embodiments. Rather, it would be appreciated by those skilled in the art that changes may be made in this embodiment without departing from the principles and spirit of the invention, the scope of which is defined in the claims and their equivalents.

What is claimed is:

1. A laser power control device for use in an optical recording and/or reproducing apparatus that records data on and/or reproduces data from an optical recording medium by using a laser diode, the device comprising:
   a photodiode which receives light radiated from the laser diode and outputs a current;
   a current-to-voltage converter which converts the current into a voltage and outputs the voltage;
   a peak-holder which peak-holds the voltage and outputs the peak-held voltage when pits are formed on the optical recording medium, and outputs the voltage without peak-holding when a space between pits of the optical recording medium is formed;
   a first sampler-and-holder which samples and holds an output of the peak-holder, and outputs a voltage corresponding to peak power;
   a second sampler-and-holder which samples and holds an output of the peak-holder, and outputs a voltage corresponding to elimination power;
   a peak current setter which sets a peak current that flows into the laser diode;
   an elimination current setter which sets an elimination current that flows into the laser diode;
   a bias current setter which sets a bias current that flows into the laser diode; and
   a calculator which calculates setting values of the peak current, the elimination current, and the bias current, based on the voltage corresponding to the peak power and the voltage corresponding to the elimination power.

2. The device of claim 1, wherein the current-to-voltage converter includes a monitoring circuit.

3. The device of claim 1, wherein the peak-holder includes a peak-hold circuit.

4. The device of claim 1, wherein the first sampler-and-holder includes a sample-and-hold circuit.

5. The device of claim 1, wherein the second sampler-and-holder includes a sample-and-hold circuit.

6. The device of claim 1, wherein the calculator includes a calculation circuit.

7. The device of claim 6, wherein two A/D conversion circuits respectively convert the outputs of the first sampler-and-holder and the second sampler-and-holder into digital outputs which are input into the calculator.

8. The device of claim 1, wherein the bias current setter includes a D/A conversion circuit.

9. The device of claim 1, wherein the elimination current setter includes a D/A conversion circuit.

10. The device of claim 1, wherein the peak current setter includes a D/A conversion circuit.

11. A laser power control device for use in an optical recording and/or reproducing apparatus that records data on and/or reproduces data from an optical recording medium by using a laser diode, the device comprising:
- a photodiode which receives light radiated from the laser diode and outputs a current;
- a current-to-voltage converter which converts the current into a voltage and outputs the voltage;
- a peak-holder which peak-holds the voltage and outputs the peak-held voltage when pits are formed, and outputs the voltage without peak-holding when a space between pits of the optical recording medium is formed;
- a first sampler-and-holder means which samples and holds the output of the peak-holder, and outputs a voltage corresponding to a peak power;
- a second sampler-and-holder which samples and holds the output of the peak-holder, and outputs a voltage corresponding to an elimination power;
- a peak power reference voltage setter which sets a peak power reference voltage;
- an elimination power reference voltage setter which sets an elimination power reference voltage;
- a first error amplifier which compares the output voltage of the first sampler-and-holder with the peak power reference voltage, amplifies an error thereof, and drives a current source used by the laser diode to generate peak power;
- a second error amplifier which compares the output voltage of the second sampler-and-holdre with the elimination power reference voltage, amplifies an error thereof, and drives a current source used by the laser diode to generate elimination power; and
- a calculator which outputs a setting value that controls a current source used by the laser diode to generate bias power, based on outputs of the first error amplifier and the second error amplifier.

12. The device of claim 11, wherein the current-to-voltage converter includes a monitoring circuit.

13. The device of claim 11, wherein the peak-holder includes a peak-hold circuit.

14. The device of claim 11, wherein the first sampler-and-holder includes a sample-and-hold circuit.

15. The device of claim 11, wherein the second sampler-and-holder includes a sample-and-hold circuit.

16. The device of claim 11, wherein the calculator includes a calculation circuit.

17. The device of claim 11, wherein the peak power reference voltage setter includes a D/A conversion circuit.

18. The device of claim 11, wherein the elimination power reference voltage setter includes a D/A conversion circuit.

19. A laser power control device usable in an optical recording and/or reproducing apparatus that records data onto an optical recording medium by using a laser diode that operates according to a single pulse method or a pulse train method, based on type of the optical recording medium, the device comprising:
- a photodiode which receives a light radiated from the laser diode and outputs a current;
- a current-to-voltage converter which converts the current into a voltage and outputs the voltage;
- a peak-holder which peak-holds the voltage when pits are formed and outputs the peak-held voltage, and outputs the output voltage when a space between pits of the optical recording medium is formed;
- an output selector which selectively outputs one of an output of the current-to-voltage conversion means and an output processed by the peak-holder, based on the type of the optical recording medium;
- a first sampler-and-holder which samples and holds the output of the output selector, and outputs a first voltage;
- a second sampler-and-holder which samples and holds the output of the output selector, and outputs a second voltage;
- a first current setter which sets a first current that flows into the laser diode;
- a second current setter which sets a second current that flows into the laser diode;
- a third current setter which sets a third current that flows into the laser diode; and
- a calculator which calculates setting values of the first current, the second current, and the third current, based on the first voltage and the second voltage.

20. The device of claim 19, wherein the current-to-voltage converter includes a monitoring circuit.

21. The device of claim 19, wherein the peak-holder includes a peak-hold circuit.

22. The device of claim 19, wherein the first sampler-and-holder includes a sample-and-hold circuit.

23. The device of claim 19, wherein the second sampler-and-holder includes a sample-and-hold circuit.

24. The device of claim 19, wherein the calculator includes a calculation circuit.

25. The device of claim 24, wherein two A/D conversion circuits respectively convert the outputs of the first sampler-and-holder and the second sampler-and-holder into digital outputs which are input into the calculator.

26. The device of claim 19, wherein the first current setter includes a D/A conversion circuit.

27. The device of claim 19, wherein the second current setter includes a D/A conversion circuit.

28. The device of claim 19, wherein the third current setter includes a D/A conversion circuit.

29. A control method of a laser power control device for use in an optical recording and/or reproducing apparatus that records data on and/or reproduces data from an optical recording medium by using a laser diode, the method comprising:
- receiving light radiated from the laser diode and outputting a current;
- current-to-voltage converting of the current output by the receiving and outputting the voltage;
- peak-holding of the voltage and outputting a peak-held voltage when pits are formed, and outputting the voltage without peak-holding when a space between pits of the optical recording medium is formed;
- first sampling-and-holding of an output by the peak-holding, and outputting a voltage corresponding to peak power;
- second sampling-and-holding of an output of the peak-holding, and outputting a voltage corresponding to elimination power;
- setting a peak current that flows into the laser diode;
- setting an elimination current that flows into the laser diode;
- setting a bias current that flows into the laser diode; and
- calculating setting values of the peak current setting, the elimination current setting, and the bias current setting, based on the voltage corresponding to the peak power and the voltage corresponding to the elimination power.

30. A control method of a laser power control device for use in an optical recording and/or reproducing apparatus that records data on and/or reproduces data from an optical recording medium by using a laser diode, the method comprising:

receiving light radiated from the laser diode and outputting a current;

converting the current into a voltage and outputting the voltage;

peak-holding the voltage and outputting the peak-held voltage when pits are formed, and outputting the voltage without peak-holding when a space between pits of the optical recording medium is formed;

first sampling-and-holding the output of the peak-holding, and outputting a voltage corresponding to a peak power;

second sampling and holding the output of the peak-holding, and outputting a voltage corresponding to an elimination power;

setting a peak power reference voltage;

setting an elimination power reference voltage;

first error amplifying by comparing the output voltage of the first sampling-and-holding with the peak power reference voltage, amplifying an error thereof, and driving a current source used by the laser diode to generate peak power;

second error amplifying by comparing the output voltage of the second sampling-and-holding with the elimination power reference voltage, amplifying an error thereof, and driving a current source used by the laser diode to generate elimination power; and calculating by outputting a setting value that controls a current source used by the laser diode to generate bias power, based on outputs of the first error amplifier and the second error amplifier.

31. A control method of a laser power control device for use in an optical recording and/or reproducing apparatus that records data onto an optical recording medium by using a laser diode that operates according to a single pulse method or a pulse train method, based on type of the optical recording medium, the method comprising:

receiving a light radiated from the laser diode and outputting a current;

converting the current into a voltage and outputting the voltage;

peak-holding the voltage when pits are formed and outputting the peak-held voltage, and outputting the voltage when a space between pits of the optical recording medium is formed;

selectively outputting one of an output of the converting and an output by the peak-holding means, based on the type of the optical recording medium;

first sampling and holding the output of the selective outputting, and outputting a first voltage;

second sampling and holding the output of the selective outputting, and for outputting a second voltage;

setting a first current that flows into the laser diode;

setting a second current that flows into the laser diode;

setting a third current that flows into the laser diode; and calculating setting values of the first current, the second current, and the third current, based on the first voltage and the second voltage.

* * * * *

UNITED STATES PATENT AND TRADEMARK OFFICE
CERTIFICATE OF CORRECTION

PATENT NO. : 7,248,553 B2  Page 1 of 1
APPLICATION NO. : 10/705240
DATED : July 24, 2007
INVENTOR(S) : Sung-Du Kwon et al.

It is certified that error appears in the above-identified patent and that said Letters Patent is hereby corrected as shown below:

On the title page item (75), Line 3, change "Jung-koog" to --Jong-koog--.

Column 17, Line 36, change "sampler-and-holdre" to --sampler-and-holder--.

Signed and Sealed this

Twenty-seventh Day of November, 2007

JON W. DUDAS
*Director of the United States Patent and Trademark Office*